Figure 1:
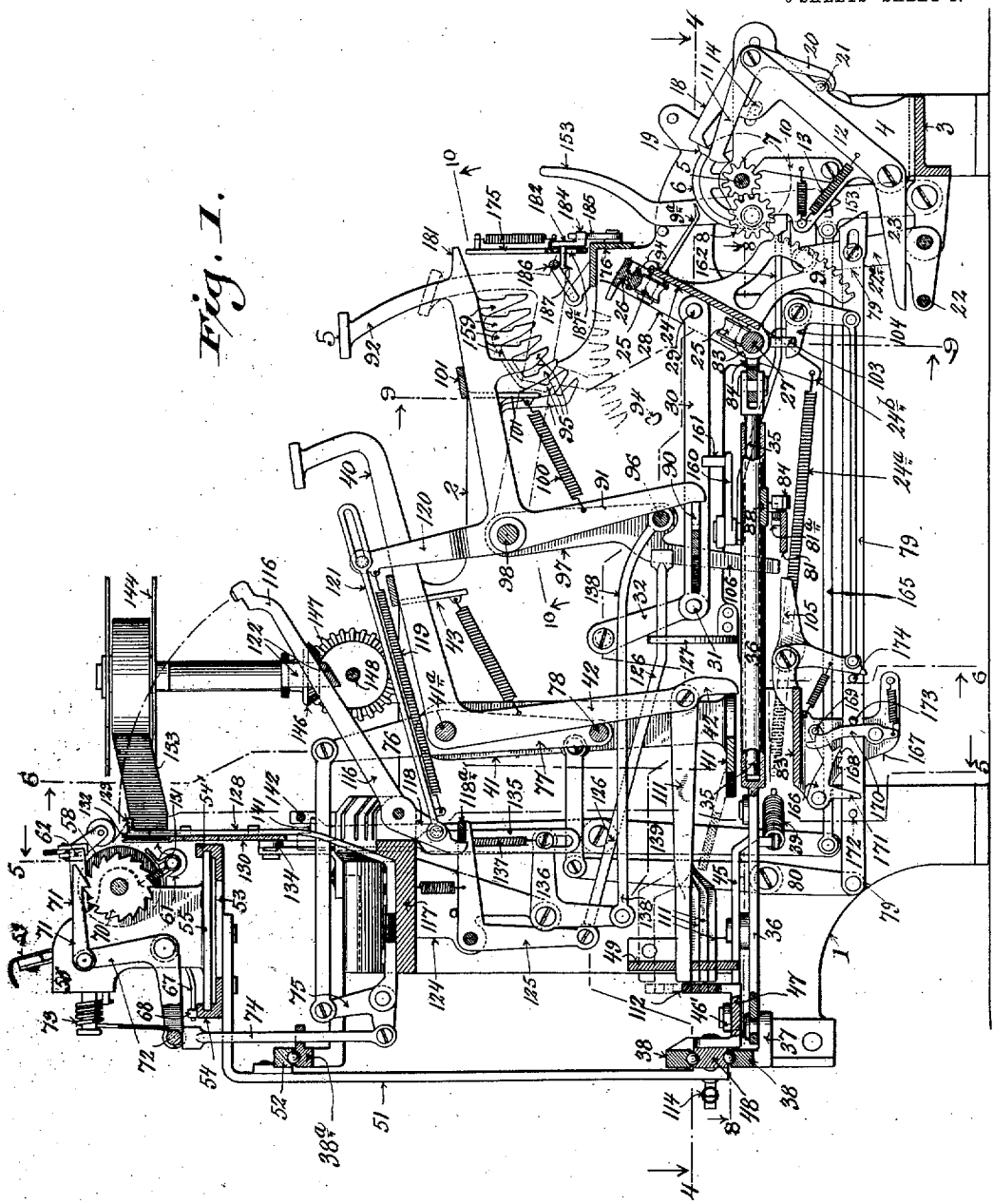

J. MALLMAN.
RECORDING CALCULATING MACHINE.
APPLICATION FILED JULY 22, 1909.

968,674.

Patented Aug. 30, 1910.
9 SHEETS—SHEET 3.

J. MALLMAN.
RECORDING CALCULATING MACHINE.
APPLICATION FILED JULY 22, 1909.

968,674.

Patented Aug. 30, 1910.
9 SHEETS—SHEET 7.

Witnesses:
Thos. J. DeLaHunt
George G. Felber

Inventor:
James Mallman
By Clipthant & Young
Attorneys.

J. MALLMAN.
RECORDING CALCULATING MACHINE.
APPLICATION FILED JULY 22, 1909.
968,674.
Patented Aug. 30, 1910.
9 SHEETS—SHEET 8.
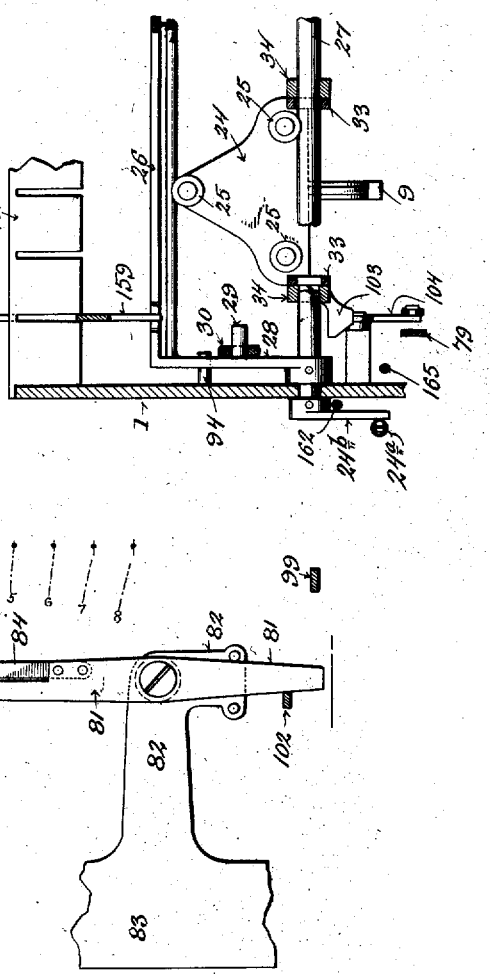
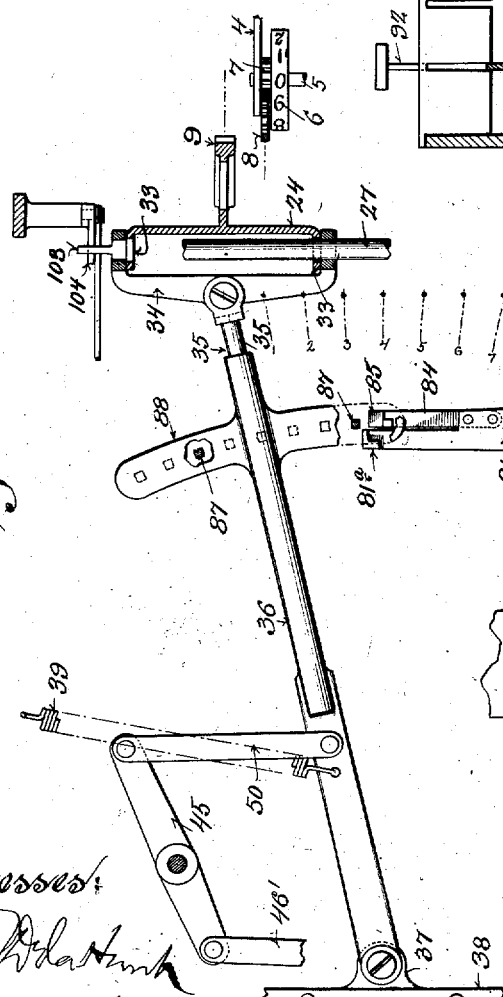

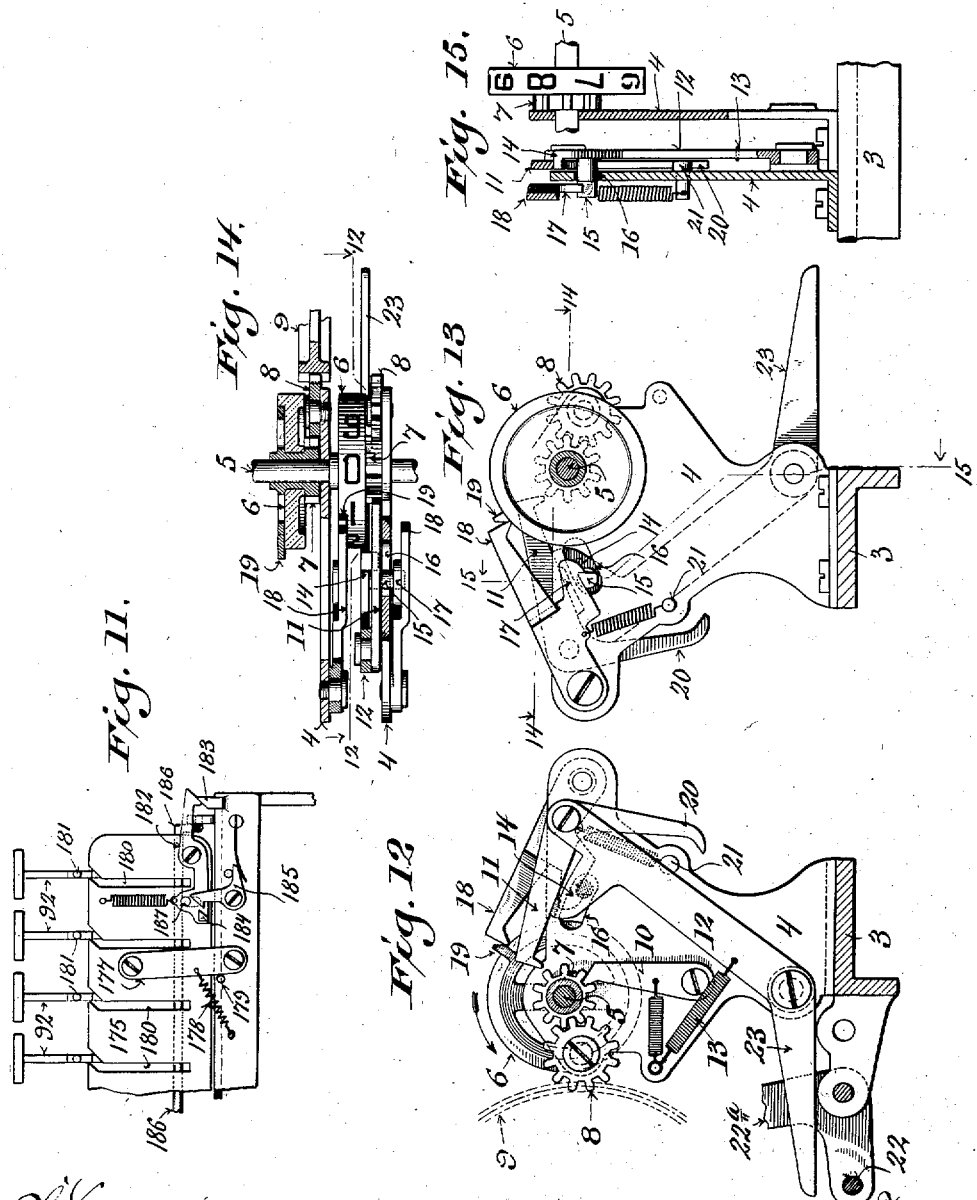

UNITED STATES PATENT OFFICE.

JAMES MALLMAN, OF SHEBOYGAN, WISCONSIN.

RECORDING CALCULATING-MACHINE.

968,674.  Specification of Letters Patent. Patented Aug. 30, 1910.

Application filed July 22, 1909. Serial No. 508,881.

*To all whom it may concern:*

Be it known that I, JAMES MALLMAN, a citizen of the United States, and resident of Sheboygan, in the county of Sheboygan and State of Wisconsin, have invented certain new and useful Improvements in Recording Calculating-Machines; and I do hereby declare that the following is a full, clear, and exact description thereof.

The general object of my invention is to provide a simple, economical, and effective recording calculator, having a single series of ten adding-keys and connected type-bars operating in conjunction with a single series of tabulator keys corresponding in number to the adding-wheels employed in the register mechanism, whereby multiplicity of the key-board is dispensed with. The mechanism is also materially simplified by reason of individual printing of each figure of an item separately similar to the printing operation of a type-writing machine, and thus the complicated mechanism necessary in assembling the various figures of an item prior to a printing-operation is dispensed with, such mechanism being generally employed in adding-machines of the recording type. The machine is further simplified due to the fact that in printing totals, the same are read from the visible registerwheels and printed in a similar manner as that just mentioned with reference to an item, the register-wheels being returned to zero incidental to the total printing.

In brief the specific objects are as follows: To provide adding-wheels and a simple mechanism for operating same, the operating-mechanism being actuated by the series of adding-keys. To provide a carrier or transfer mechanism for said adding-wheels. To provide a total-lever with total-lever lock and trip. To provide an adding-wheel actuating-mechanism in the form of an oscillatory toothed sector, the sector being capable of a horizontal step-by-step movement from one adding-wheel to the other under control of an escapement-connection. To provide a graduated plate in connection with the adding-keys, whereby the oscillatory movement of the toothed sector is controlled with relation to the adding-wheels. To provide a universal-bar arranged to be actuated by the adding-keys, which universal-bar actuates the escapement controlling horizontal movement of the toothed sector. To provide a ribbon-shift mechanism and type-bar lock-and-release mechanism. To provide means in connection with the total-lever for shifting the graduated plate during a totaling-operation, whereby movement of the adding-wheels is controlled. To provide an adding-key locking-mechanism, whereby only one key can be depressed at a time. To provide an individual key for actuating the escapement-mechanism, and an adding-key lock arranged to be actuated by the horizontal movement of the toothed sector. To provide a universalswing bar in operative-connection with the tabulator-keys and mechanism connected therewith for loading the adding-wheel transfer or carrier-mechanism. To provide a roller-platen and means for actuating the same for line-spacing, in connection with the universal-swing bar of the tabulatorkeys. To provide a graduated plate adapted to be actuated by the tabulator-keys, the plate being linked to the mechanism controlling the horizontal movement of the adding-wheel toothed sector, whereby the same is moved in one direction step-bystep and alined with any one of the series of adding-wheels. To provide a carrier upon which the roller-platen and its paper carriage are adjustably mounted, the carrier being connected to the segmental rack-actuating mechanism, whereby said carriage is moved longitudinally with each horizontal movement of the toothed sector to effect automatic spacing between a row of figures collectively indicating an item. To provide a series of plunger-stops in connection with the tabulator-keys, which stops operate in conjunction with a graduated stop-plate that is secured to the carrier to prevent overthrow of the latter and also secure vertical alinement of the toothed sector and adding-wheels. To provide means for adjusting and locking the paper-carriage and its platen longitudinally of the carrier, whereby column-adjustment of the paper is had. To provide a spring-connection between the type-bars and adding-keys, whereby said type-bars are actuated by a fixed spring-pressure to print when released. To provide a two-colored ribbon and means for feeding the ribbon and reversing said feed. To provide means in connection with the total-lever and ribbon, whereby the latter is shifted to print in a distinctive color for a total-operation. To provide a pointer in connection with the toothed sector, whereby the adding-wheel to be acted upon is indicated.

With the above objects in view, the invention consists in various other details of construction and combination of parts as fully set forth hereinafter with reference to the accompanying drawings and subsequently claimed.

Figure 2:
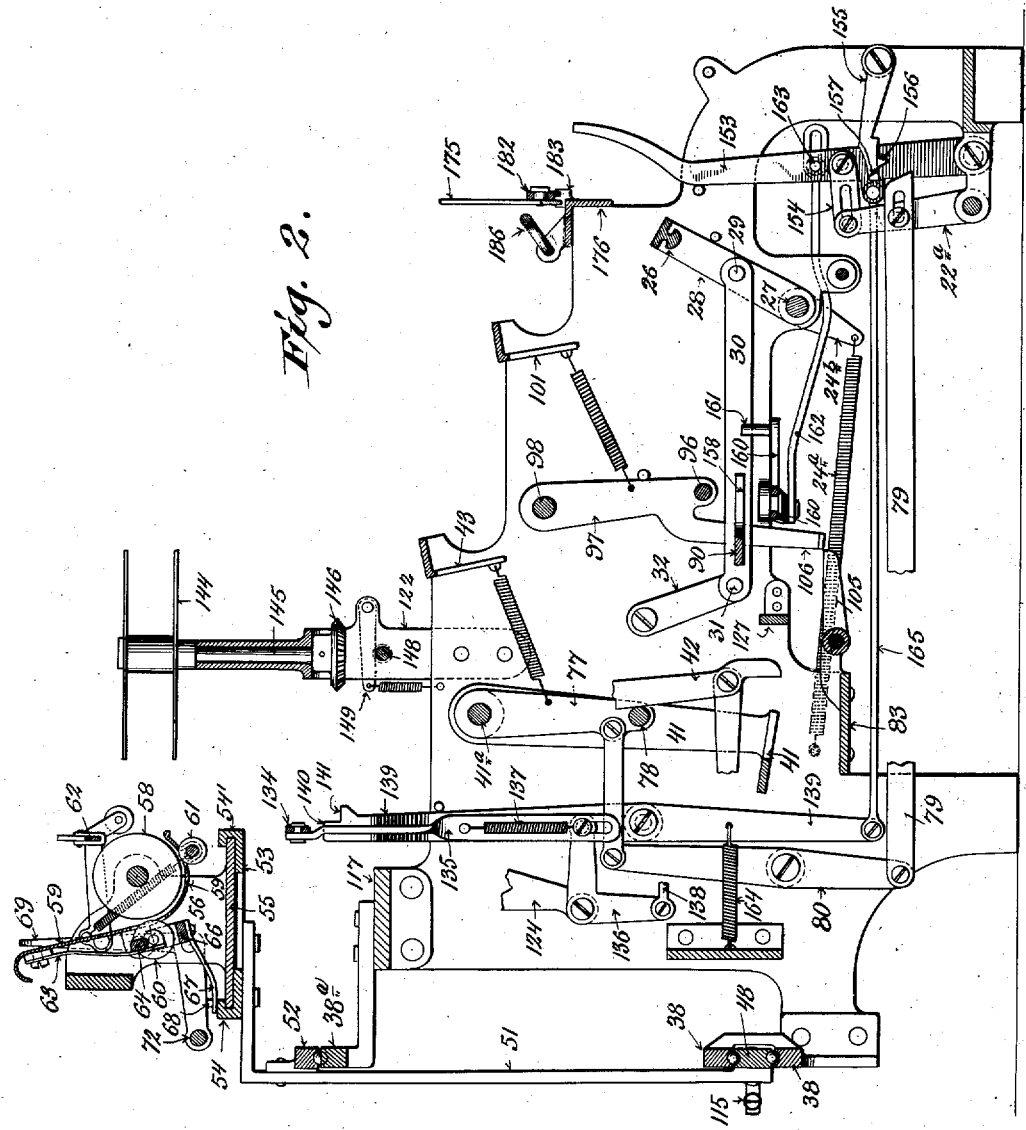
Figure 3:
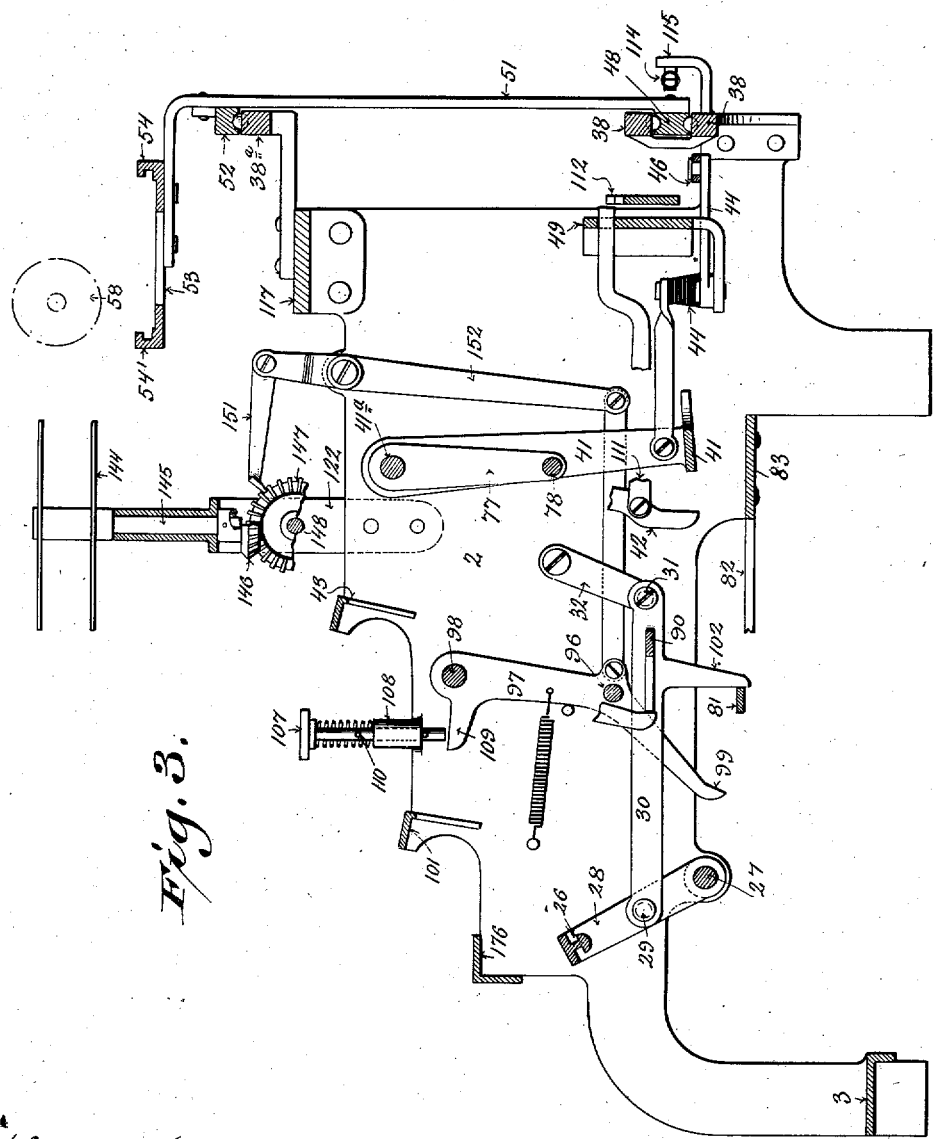
Figure 4:
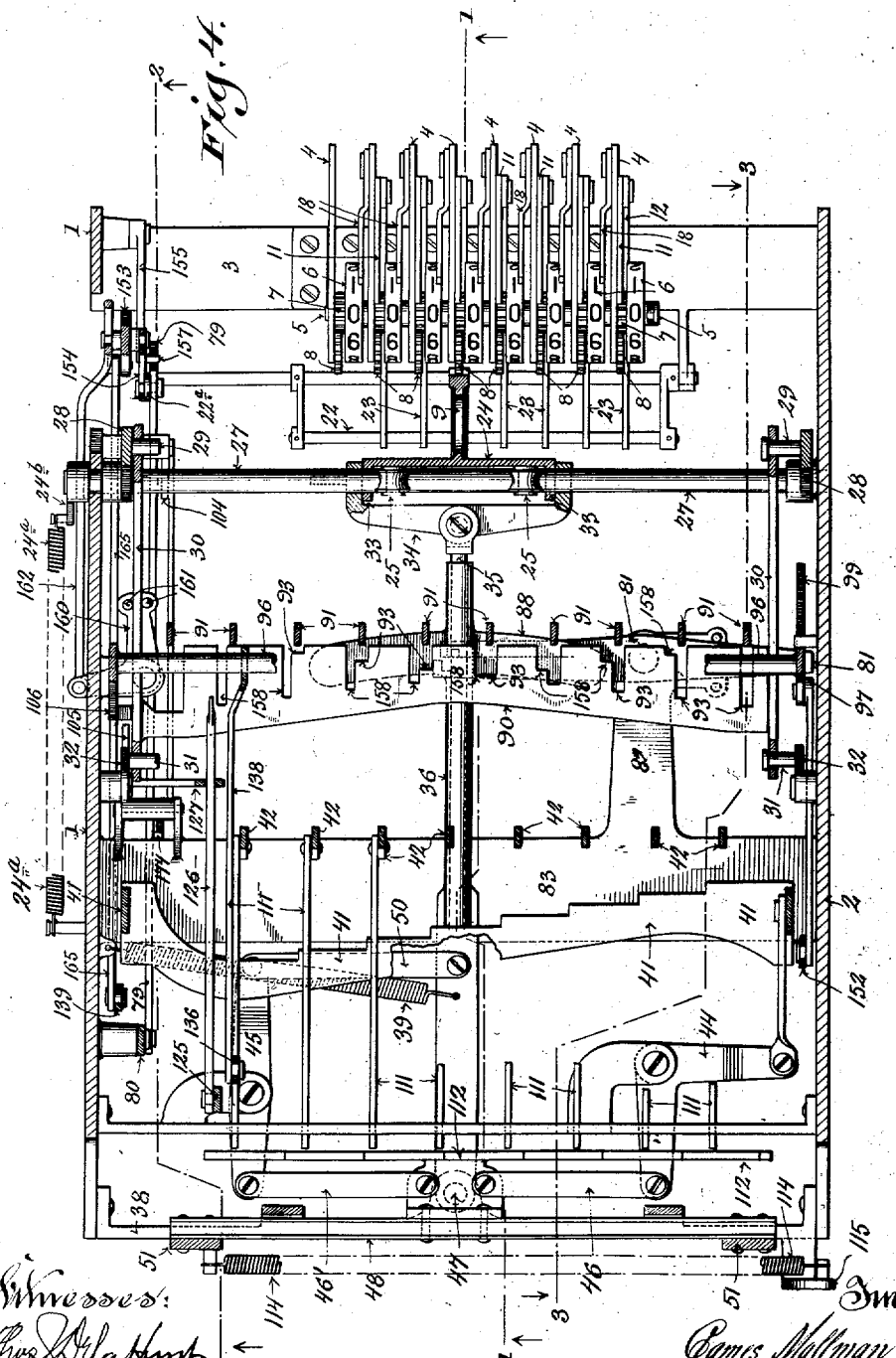
Figure 5:
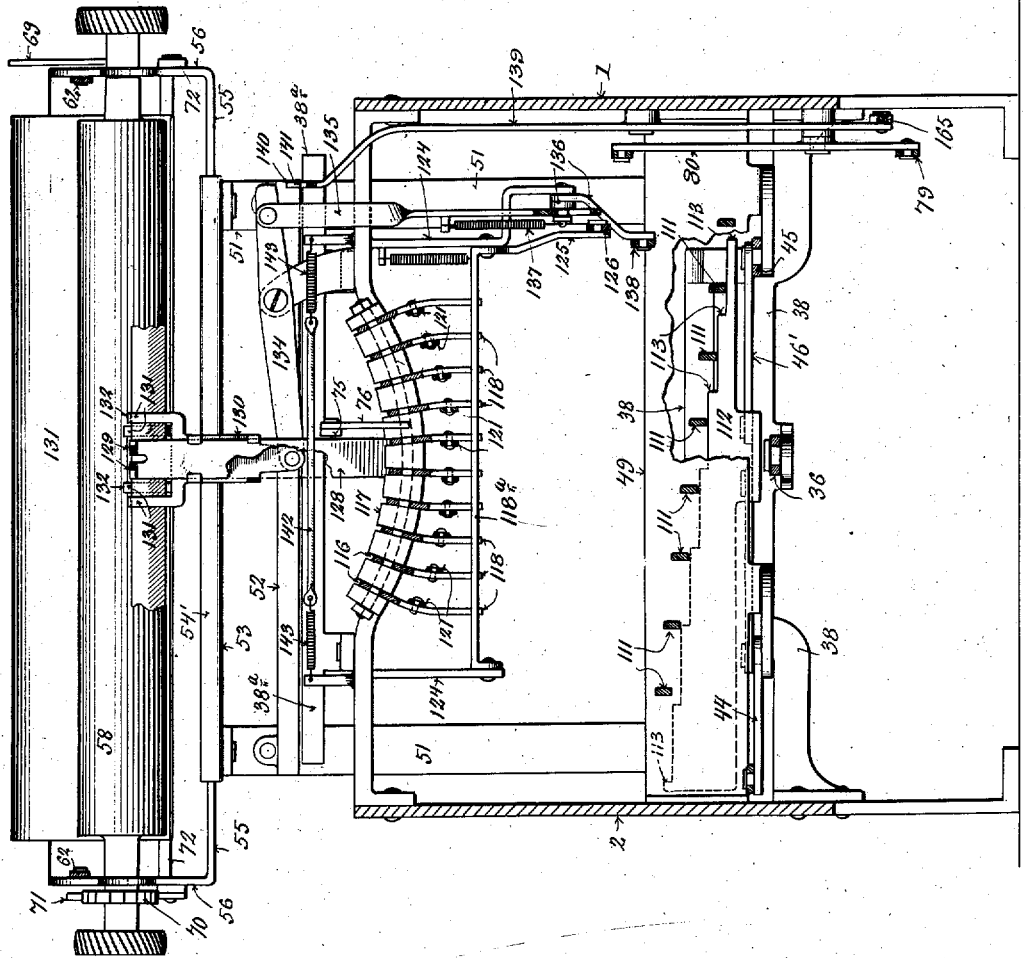
Figure 6:
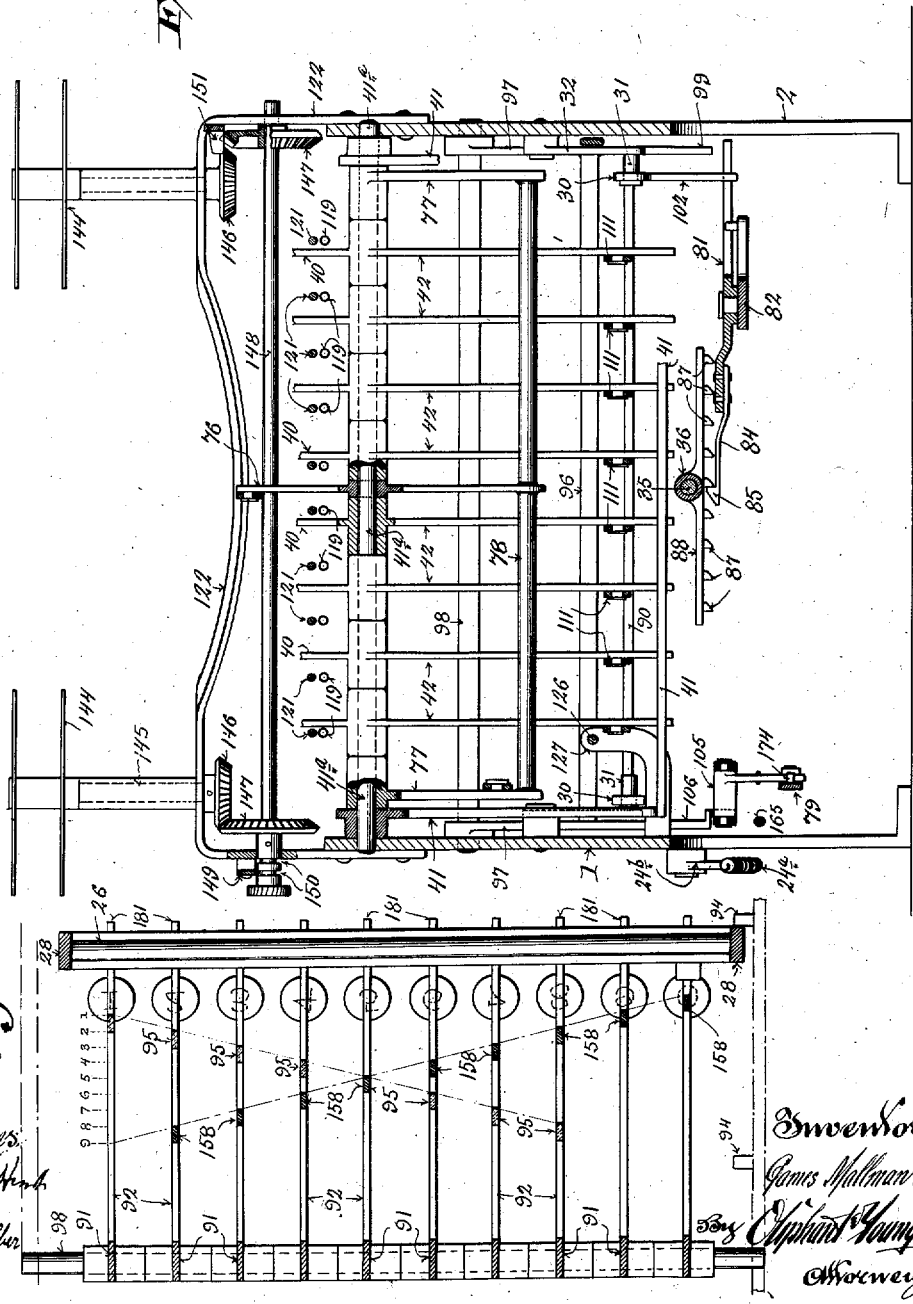
Figure 7:
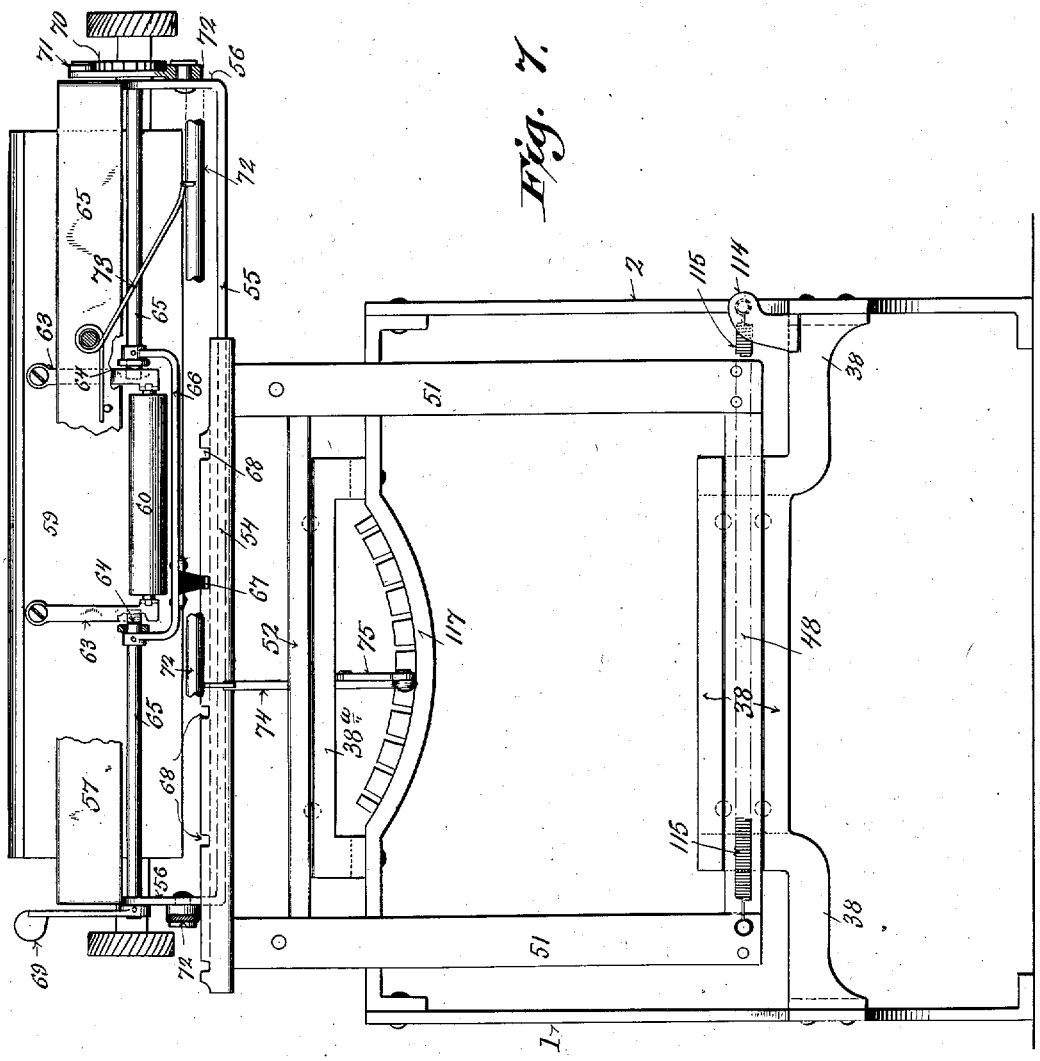

In the drawings: Figure 1 represents a longitudinal sectional view of a recording calculator embodying the features of my invention, the section being indicated by line 1—1 of Fig. 4; Fig. 2, a longitudinal section view of the same, as indicated by line 2—2 of Fig. 4; Fig. 3, a longitudinal sectional view of the machine looking in the opposite direction from that shown in Fig. 2, the section being indicated by line 3—3 of Fig. 4. Fig. 4, a plan sectional view of the machine, the section being indicated by line 4—4 of Fig. 1; Fig. 5, a cross-section of the machine, as indicated by line 5—5 of Fig. 1; Fig. 6, a cross-section of the same, as indicated by line 6—6 of Fig. 1; Fig. 7, a rear view of the machine-frame showing the paper-carriage mechanism with parts broken away and parts in section to better illustrate certain structural features; Fig. 8, a detail plan view of the operating toothed sector of the adding-wheels and its connected step-by-step actuating-mechanism, the section being indicated by line 8—8 of Fig. 1; Fig. 9, a detail transverse section of the same, as indicated by line 9—9 of Fig. 1; Fig. 10, a sectional view in diagram of the adding-key stops and oscillatory frame which carries the toothed sector of the adding-wheels, the diagram being shown to clearly illustrate the two series of stops controlling the movement of said frame during a total-operation or adding-operation; Fig. 11, a detail elevation of a portion of the mechanism provided for locking the adding-keys after one of the series have been depressed; Fig. 12, a detail sectional view of one of the adding-wheels and its carrying-mechanism, the section being indicated by line 12—12 of Fig. 14; Fig. 13, is a similar view of one of the adding-wheels and its carrying-mechanism, looking from the reverse side; Fig. 14, a detail sectional plan view of a portion of the adding-wheel mechanism, as indicated by line 14—14 of Fig. 13, and Fig. 15, a sectional view of the same, as indicated by line 15—15 of Fig. 13, one of the adding-wheels being shown in elevation.

Referring by characters to the drawings, 1 and 2 indicate standards, which, together with a series of cross-braces constitute the machine-frame, the front cross-brace 3 being arranged to support a series of brackets 4 secured thereto. A fixed shaft 5 passes through apertures in the series of brackets, the shaft constituting a bearing for a series of adding-wheels 6 loosely mounted thereon, eight of which adding-wheels are shown in the series, and as so provided the machine is capable of registering and recording amounts up to 900,000.00. The first two adding-wheels of the series from right to left register amounts up to .99, the third wheel registering dollars, and so on through the series. The face of each adding-wheel is provided with the usual cipher and numerals from 1 to 9 inclusive, being spaced equal distances apart circumferentially of the adding-wheel which wheel carries a ten-toothed pinion 7 that extends from its hub and is adapted to mesh with a twelve-toothed transmission-pinion 8, which latter pinion is loosely mounted upon a stud carried by the adjacent bracket 4. The transmission-pinion 8 of each of the adding-wheel sections is so disposed as to be engaged by an oscillatory toothed sector 9, which sector is also capable of a longitudinal step-by-step movement, whereby each of the adding-wheel transmission pinions 8 may be successively engaged when the sector is vertically oscillated, said sector being controlled in its longitudinal movement by a motor-spring in opposition to an escapement-mechanism to be hereinafter described. Mounted upon the brackets 4, which brackets each carry a complete adding-section, is a spring-controlled click-pawl 10 that engages the pinion 7 and serves to prevent back-lash of the adding-wheel when the same is actuated by the toothed sector 9. A feed-pawl 11 is pivoted to the upper end of a bell-crank lever 12, the bell-crank being fulcrumed to the bracket and is provided with a loading-spring 13 connecting the same and said bracket. The nose of the feed-pawl 11 is normally clear of the pinion 7, which pinion it engages and moves the distance of one tooth, whereby a carrying-operation from the adding-wheel of lower order is transmitted to the next adding-wheel of higher order, the details of which carrying-mechanism are best shown in Figs. 12 and 13 of the drawings.

Figs. 12 and 13, illustrate the carrying-mechanism in its loaded position, in which position the feed-pawl is clear of the pinion 7 and rests upon a finger 14 of the bell-crank 12. The finger 14 also carries a stud 15 that extends through a slot 16 in the adjacent bracket 4, the stud being normally engaged by a locking-dog 17, which dog constitutes a portion of a spring-controlled trip-latch 18 that is pivoted to said bracket and extends in the path of travel of a peripheral tooth 19 carried by the adding-wheel of lower order, it being understood that the carrying-mechanism controlled by this trip-latch operates upon the adding-wheel section preceding.

When the adding-wheels are at zero, the ciphers are alined so as to be clearly visible to the operator and the tooth 19 of each adding-wheel in this position is just in advance of the nose of the trip-latch 18. Thus there will be no movement of the trip-latch until its particular adding-wheel has moved nine spaces, in the direction indicated by the arrow, after which time said tooth 18 lifts the trip-latch and causes disengagement of the locking-dog 17 with the stud 15 of the bell-crank 12. When this release takes place, due to the locking-dog, the loading-spring 13 being free to act causes forward movement of the bell-crank, whereby the feeding-pawl 11 engages the pinion 7 and thus moves the adding-wheel of higher order, the distance of one space to effect a registration of the proper amount. At the instant of release of the carrying-mechanism, by the trip-latch 18, its locking-dog 17 will engage the upper face of the stud 15 and thus prevent reëngagement of these parts, there being a tail 20 extending from the feed-pawl for engagement with a pin 21, whereby said feed-pawl when moved forward to accomplish a carrying-operation is held in meshing-engagement with the pinion 7, locking the wheel to prevent overcarrying from momentum. After the carrying-mechanism has been tripped, it is re-loaded whenever a tabulator-key is depressed, by means of a rocker-bar 22, that extends under arms 23 of the bell-cranks 12, which rocker-bar is fulcrumed to ears projecting from the cross-brace 3 and is arranged to be oscillated by mechanism to be hereinafter described.

The toothed sector 9 is provided with ten teeth, corresponding in number to the teeth of the pinions 7 of the adding-sections, the first tooth of the sector, as shown in Fig. 1, being normally below the transmission pinion 8 the distance of the space of about one tooth, and so disposed relative to said transmission pinion as to engage a tooth of the latter when said section is oscillated the distance of one space. The sector 9 extends from and forms part of a carriage 24, which is provided with rollers 25 that engaged upper and lower horizontally disposed rails 26, 27, respectively, of an oscillatory carriage-frame, the lower rail 27 of the carriage-frame being mounted in bearings of the standards 1 and 2. The carriage-frame rails 26 and 27 are connected by side-bars 28 having studs 29 extending therefrom for engagement with links 30, the opposite ends of which links being supported by studs 31 that extend from hangers 32 pivoted to said frame standards 1 and 2. The rollers 25 of the carriage 24 are provided with concavo-convex faces for engagement with corresponding faces of their respective rails, whereby lateral play of said carriage with relation to its frame is prevented, there being apertured ears 33 extending from the lower portion of the carriage surrounding the lower rail 27, whereby said carriage is further supported in its place.

From the foregoing description, it will be seen that the toothed sector 9 may be freely oscillated to engage the transmission pinions 8 of the adding-sections and that the carriage 24 is free to travel back and forth within its frame parallel with the transmission pinions, whereby any one of the same are alined with said toothed sector.

A spanner 34 engages the lower rail 27 of the carriage-frame, this rail being circular in cross-section to permit oscillation thereof with relation to the spanner, the engaging-end of which spanner overlaps the ears 33 of the carriage. The spanner is provided with a pivoted rod 35 having telescopic-engagement with a tubular arm 36, which arm is pivoted to an ear 37 that extends from a rear cross-rail 38 secured to the frame-standards of the machine. A coil-spring 39 connects the tubular arm 36 with the frame-standard 1, as best shown in Figs. 4 and 8 of the drawings, the said spring constituting a motor that exerts its force to move the tubular arm and carriage 24 from left to right or toward the adding-sections of lower order. The tubular arm 36 is manually operated in opposition to its motive power of the spring, by means of any one of a series of tabulator-key levers 40, which correspond in number to the adding-sections, being arbitrarily designated by colors displayed upon push-buttons carried thereby, it being understood that the adding-sections are correspondingly designated, thus the first two keys from right to left designate cents and tens of cents respectively; the third key dollars, and so on throughout the series. The connection between the tabulator key levers and the toothed sector 9 is so arranged that if the third or dollars key should be depressed, said toothed sector will be moved from right to left to a position alined with the transmission pinion 8 of the dollars adding-section, or if the hundred dollars key is depressed a greater movement of the sector is obtained in the same direction whereby it is brought to an alined position with the "hundred dollars" adding-section, and so on.

Each key-lever 40 and its connected mechanism is arbitrarily arranged to move the carriage 24 from right to left at different fixed distances. This movement is accomplished by means of a gage-plate 41, which is suspended from a rod 41ª secured in the side standards of the frame, the rod also serving as a fulcrum for the series of tabulator-key levers 40. These tabulator key levers have depending arms 42 for engagement with a face of the gage-plate 41, which face is notched to form a series of steps, each step being spaced at a different distance from the contact-faces of the arms 42 of the tabulator keys. Thus from right to left of the machine, for example, the first tabulator arm would be the distance of seven spaces from the working-face of the gage-plate, the next arm six spaces and so on throughout. By this construction it will be seen that all of the tabulator keys have the same stroke, but each key imparts a greater or less movement to the gage-plate. While I have shown the gage-plate working-face as being stepped, it is obvious that in some instances it may be upon a single plane and the arms 42 of the tabulator keys flared upon different planes to accomplish the same result. The tabulator key levers 40 are preferably each guided in a comb-strip 43 that connects the frame standards 1 and 2, there being coil-springs connecting the arms 42 of the tabulator key levers and the comb-strip, whereby each key is independently restored to its normal position after being actuated. As best shown in Figs. 3 and 4 of the drawings, the gage-plate 41 is linked to a bell-crank 44, which bell-crank in turn is connected to a lever 45, through the medium of a pair of links 46, 46', the intermediate ends of these links being pivoted to an ear 47 that is connected to a slide-bar 48, which bar comprises one member of a reciprocative carrier to be hereinafter described. The lever 45 and bell-crank 44 are each fulcrumed to extensions of a cross-brace 49 secured to the frame-standards 1 and 2, the tubular arm 36 being connected to said lever 45, by means of a link 50. Thus it will be seen that movement is imparted to the gage-plate through the arms 42 of the tabulator key-levers, which movement will be transmitted to said tubular arm 36 by means of the several levers and link connections just described.

The slide-bar 48, which constitutes one member of a reciprocative carrier is connected by standards 51 to an upper slide-bar 52, the standards also forming supports for a bed 53, which bed is provided with longitudinal ways 54, 54', for the reception of a base-plate 55 of a paper-carriage frame. This frame is composed of end-brackets 56 which extend from the base-plate and a rear brace-bar 57 connecting said end-brackets. The usual roller-platen 58 is mounted in bearings provided in the end-brackets 56, there being a paper-shield 59 carried by the paper-carriage together with spring-controlled paper-gripping rolls 60, 61, and a gage-bar 62, all of which features constitute no parts of my invention. The rear gripping-roll 60 has its bearings in leaf-springs 63 which are secured to the rear face of the paper-shield 59. Projecting under the leaf-springs are flattened extensions 64 of a rod 65, which rod is trunnioned in ears extending from the paper-shield and has end-bearings in the brackets 56 of the carriage-frame. a section 66 of the rod 65 being looped about the gripping-roll 60. Secured to the section 66 of the rod aforesaid is a finger 67, which finger is arranged to engage any one of a series of notches 68 formed in a rib extending from the carrier-way 54. One end of the rod 65 is provided with a hand-grip 69, by means of which grip said rod is rocked in its bearing, thereby causing the flattened end 64 thereof to lift the gripping-roller 60 from its contact with the surface of the roller-platen. This movement also causes the finger 67 to disengage from its seat in the notch 68, into which it had previously been adjusted. Thus the paper-carriage proper and the platen may be longitudinally adjusted and locked relative to the carrier, whereby any one of a series of columns indicated upon a wide sheet of paper carried by the platen may be moved to the printing-point of the machine. Rotation of the platen for line-spacing is attained through a ratchet-wheel 70 fast on the platen-roller shaft, the ratchet-wheel being engaged by a pull-pawl 71 that is carried by an arm of a bail 72. Feed of the platen for line-spacing is accomplished through the medium of a spring 73 which is carried by the brace-bar 57, one end of the spring being opposed to the bail 72, which bail extends from end to end of and rearward of the carriage. The bail 72 is lifted in opposition to its spring 73, by a plunger 74 suitably supported directly under said bail, the plunger being connected to a bell-crank 75 which is linked to an arm 76 of a universal-swinging bar 77, the bar being suspended from the rod 41$^a$, upon which rod are mounted the tabulating-key levers. A rod 78 of the swing-bar extends across the width of the machine directly forward of the tabulator-arms 42, whereby motion is imparted to said swing-bar when any one of the tabulator keys is depressed, and thus it will be seen, by referring to Fig. 1, that with each depression of a tabulator-key, motion is transmitted to the bail 72 and from thence to the ratchet-wheel, whereby line-spacing of the platen-roller is had upon the recovery of the depressed tabulator-key to its normal position.

Re-loading of any or all of the adding-sections must be accomplished simultaneous with the depression of a tabulator-key. To attain this result, the rocker-bar 22 is provided with an arm 22$^a$, which arm has secured thereto the slotted end of a loading-bar 79, and the opposite end of this bar is connected to one end of a lever 80 that is fulcrumed to the frame-standard 1 of the machine, the long arm of which lever is linked to the universal swing-bar 77, whereby movement of the latter causes the rocker-bar 22 to reset or load any adding-section, which had previously been actuated, this movement being due to thrust of the loading-bar imparting action to the arm 22$^a$.

Referring to Fig. 8 of the drawings, the toothed sector 9 and its connected parts are shown in the position assumed when said sector has moved from left to right the entire distance of nine spaces, having come to rest the distance of one space rearward of the last or "cents" adding-section. The mechanism is drawn to the above described position by the motor-spring 39 operating in opposition to an escapement-lever 81, which lever is pivotally mounted upon an extension 82 of a cross-brace 83 of the machine-frame. The escapement-lever 81 carries a spring-finger 84, having a head 85 with an abrupt engaging-face with which a series of spur-teeth 87 are arranged to contact, the spur-teeth (nine in number) being extended from a shoe 88 that forms part of the tubular arm 36, said teeth being circumferentially disposed with relation to the pivotal point of the tubular arm. The head of the spring-finger 84 is also provided with a bevel-face, whereby the spur-teeth 87 may act to depress and pass over the spring-finger when the tubular arm 36 is moved in opposition to its motive force. The escapement-lever is also provided with a right-angle tooth 81ª in rigid connection therewith, the working-face of which tooth is disposed to one side of the spring-finger engaging-face and a distance in advance of the same, equal to half the distance traveled by the toothed sector in its step-by-step movement. The extension 82 upon which the escapement-lever is mounted is provided with suitable stops, whereby movement of said escapement-lever is limited in either direction. From the foregoing it will be understood that if the escapement be moved so that the engaging-face of the spring-finger 84 is shifted from the path of travel of any one of the spur-teeth 87, the tooth so released will move forward until checked by the rigid tooth 81ª of the escapement lever, against which latter tooth the tooth 87 will seat. A reverse movement of the escapement causes the confined spur-tooth 87 to be freed from the escapement rigid tooth 81ª, and the tubular arm 36 is thereby permitted to complete a movement of one space, the succeeding spur-tooth 87 of the series in the meantime having been caught by the engaging-face of the spring-finger 84.

Assuming that the operator wishes to print an item with eight figures, which is the capacity of the machine as shown, the amount for illustration being 900,000.05. The parts being in the position as shown in Fig. 8, the toothed sector 9 would consequently have to be shifted from the position shown, from right to left the entire distance of its movement of nine spaces. This is accomplished by depressing the last tabulator-key from right to left of the series, which action causes the gage-plate 41 to move the limit of its stroke, and through its link-connection with the tubular arm 36, the latter will be moved to the desired point in opposition to the coil-spring 39. In this movement, the spring-finger 84 of the escapement-lever was depressed with each engagement of the series of spur-teeth 87 carried by said tubular arm. The toothed sector 9 will now assume a position similar to that shown in Fig. 1, with relation to the adding-section of highest order, the section being alined with the transmission pinion 8 of said section. In order to print the numeral 9, the sector together with its carriage 24, must be oscillated about the carriage-frame axis. This movement is accomplished through motion imparted to the links 30, which links are connected to the carriage 24, by means of the studs 29, said links being also rigidly connected by a gage-plate 90, which gage-plate is actuated by arms 91 of a series of ten adding-key levers 92, as best shown in Figs. 1 and 4 of the drawings.

As best shown in Figs. 1 and 4, the adding-key gage-plate 90 is formed with a series of graduated notches 93, the depth of which notches are successively increased from the third key from right to left of the machine. The first key of the series is the cipher-key, the second key being for printing the numeral 9 is so indicated, and the third key for printing the numeral 8, and is likewise indicated, and so on throughout the system to the last key from right to left, which is marked "1." The gage-plate 90 is cut away opposite the cipher adding-key to such distance with relation to its arm 91, that when said cipher-key is actuated, the gage-plate will be moved the distance of only one space. This movement of the gage-plate will impart no movement to any of the adding-sections, owing to the distance of one space between the transmission pinion 8 and normal position of the first tooth of sector 9. The next key, which is designed to print and register the numeral 9, has its arm 91 directly in contact with the gage-plate 90. The toothed sector 9, as previously described, is now alined with the last adding-section mechanism, and if the "nine" adding-key is depressed the gage-plate 90 will be moved its full distance causing the toothed sector and its carriage to rotate about the carriage axis and thereby describe its full oscillatory motion, in describing which motion the last adding-section is rotated nine-tenths of a revolution and will thereby cause the numeral 9 on the face of the adding-wheel to appear visible at the reading-point of the adding-section, it being understood that a suitable slotted housing (not shown) is adjusted over said adding-section through which registered items may be read and that all register-sections were at zero at the time of the operation. When the ninth key was so depressed, the carriage 24 was checked in its oscillatory movement by contacting with one of a pair of fixed stops 94, but the remaining keys of the series are provided with stops 95 depending from the several keys and so disposed with relation to the carriage 24 that the latter will be checked at the desired intermediate point of its oscillatory movement relative to the depressed key, whereby the proper movement of the register-sections is insured. These stops are clearly shown in Figs. 1 and 10. When the ninth key was depressed, its arm 91 also engaged a spring-controlled universal bar 96, which bar is provided with vertically disposed arms 97. The arms 97 of the bar are suspended from a fixed rod 98, the rod forming a fulcrum-point for the series of adding-keys, and is secured to the standards 1 and 2. After the toothed sector has acted upon the register-section, due to oscillation of the carriage together with the carriage-frame, said frame and carriage are returned to their normal position, by means of a coil-spring 24$^a$, which spring is connected to an arm 24$^b$ that is secured to the lower rail 27 of the carriage and side standard 1, as best shown in Fig. 2, the carriage being checked in its return by one of the stops 94.

As clearly shown in Fig. 3 of the drawings, one of the vertically disposed arms 97 of the universal bar carries a tappet finger 99, which finger through the movement of the bar 96 engages the adjacent end of the escapement lever 81. Thus after the sector has described its full movement, the tappet-finger acting upon the escapement-mechanism, will permit the toothed sector 9 to move from left to right one-half of a space and thereby disengage from the transmission pinion 8. When depressed adding-keys are released they are brought to their normal position by means of coil-springs 100, which springs are connected to the adding-key arms 91 and a comb-plate 101, the comb-plate serving as a guide for said adding-keys, and is similar in construction to that described in connection with the series of tabulator-keys. Upon the recovery of the ninth key previously described as being depressed, a spur 102 that is carried by one of the links 30, will act upon the escapement-lever and thereby cause the tubular arm 36, together with the sector, to complete the movement of one space. Thus it will be seen that the toothed sector 9 moves upward on its working-stroke, then forward from left to right one-half of a space, whereby it is disengaged from the transmission pinion 8. Then said sector will drop vertically to its normal position and thereafter complete its one-space forward movement so as to be brought into alinement with the preceding adding-section of lower order. This last horizontal movement is accomplished, through the spur 102, which engages the escapement just before the toothed sector recovers to its normal position of rest. To complete registration of the 900,000.05 item, the operator would depress the cipher adding-key six times, causing back-and-forth movement of the gage-plate 90 the distance of one space with each operation. This action would only oscillate the sector, without imparting any movement to the adding-sections, the degree of oscillatory movement of said sector not being sufficient to cause engagement and rotation of the transmission pinion. The escapement mechanism however would be operated with each depression of said cipher-key and the sector 9 would move step-by-step in a horizontal direction a distance of six spaces, bringing said sector in alinement under the transmission pinion 8 of the cents adding-section. The fifth adding-key would next be depressed, causing the cents register-section to indicate 5 cents, this operation being similar to that described in connection with the "nine" adding-key, except that in this last instance the stop 95 of the fifth adding-key would limit the oscillatory movement of the toothed sector 9, the stop being depressed into the path of travel of the upper rail 26 of the carriage frame 24. In this last operation, the sector and its carriage will have moved one space forward of the cents adding-section and reached the limit of its movement from left to right, as shown in Fig. 8, at which time it is desirable to lock the adding-keys. This locking-movement is accomplished by means of a lug 103, as shown in Figs. 1 and 9, the lug being carried by the spanner 34, which spanner serves to impart horizontal movement to the sector carriage. This lug 103 engages a bell-crank 104, which bell-crank is fulcrumed to the side standard 1 and is in link-connection with a spring-controlled locking-lever 105, which lever is fulcrumed between ears extending from the cross-brace 83. When the movement previously described in connection with the "five" adding-key takes place, the lug 103 of the spanner engages and rocks the bell-crank 104 causing a corresponding rock of the locking-lever 105, one arm of which locking-lever is thereby brought into the path of travel of a depending finger 106 that extends from the universal-bar arm 97, and thus it will be seen that all of the adding-keys are locked against depression, due to their contact with the universal-bar 96, which bar is now locked by the finger 106. Should the highest figure of the next item to be registered be in the hundreds, it is obvious that the hundreds-column tabulator-key must be depressed, which movement causes the sector to travel from left to right and be arrested in alinement with the hundreds adding-section pinion, the operator thereafter depresses the adding-key corresponding to the amount desired to be registered. Thus the toothed sector 9 may be moved from a sector of lower order to any sector of higher denomination, by actuating the properly designated tabulator-key. Should the operator inadvertently depress the tabulator-key in advance of the key required, a pointer 9$^a$ which extends from the sector carriage will indicate the error, due to its alinement with the adding-section upon which said sector will next act. In case of such an error the sector 9 may be returned to its correct position by means of a spring-controlled spacing-key 107, which spacing-key, as shown in Fig. 3, is loosely mounted in a bearing 108 carried by the frame-standard, the stem of the key being arranged to engage a foot 109 that extends from the vertical arm 97 of the universal-bar 96. Owing to the provision of the spacing-key, it is apparent that the universal-bar and its vertical arms may be swung upon the bearing-rod 98, by a depression of said key, whereby the tappet-finger 99 will actuate the escapement-mechanism in a similar manner to that previously described in connection with the adding-keys. This movement is limited to a distance equal to the movement imparted to the universal-bar, the movement being limited by means of a stop-pin 110, which pin projects from the releasing-key stem and is arranged to engage the head of the bearing 108.

In order to prevent overthrow of the toothed sector 9, when actuated in a horizontal direction by means of the tabulator-keys and thereby insure alinement of the same with the adding-sections, each tabulating-key is provided with a horizontally disposed plunger-bar 111, the bars being pivoted to the arms 42 of the tabulator-key levers. The opposite ends of these plunger bars 111 extend through and are guided in slots in the cross-brace 49, the slots and bars supported therein being spaced at equal distances apart transversely of the machine and are each disposed upon a different horizontal plane. The ends of the plunger-bars so arranged serve as stops, acting in conjunction with a stop-plate 112, which stop-plate is provided with a series of vertically disposed stepped faces 113 upon different horizontal planes, the faces corresponding in number to the plunger-bars against which they are arranged to contact, when the plunger-bar corresponding to a particular stepped face 113 has been forced into the path thereof by means of a tabulator-key movement. Thus for instance, as shown in Fig. 5, the "cents" plunger-bar and corresponding stepped face of the stop-plate are so arranged as to be normally set at a distance of a single space apart, the next or "tens of cents" plunger-bar two spaces from its stepped face, the third or "dollars" plunger-bar three spaces, and so on throughout, the last plunger-bar being eight spaces distanced from the opposing stepped face 113 of said stop-plate, in which position the toothed sector 9 is at the extreme of its movement from left to right of the machine, as shown in Fig. 8. The stop-plate 112 is secured to and moves with the slide-bar 48 of the carrier, being extended from and forming a part of the ear 47. Thus if the last tabulator-key be depressed, the toothed sector 9 swings to a horizontal position, so as to engage the last adding-section, and the stepped face 113 of the stop-plate 112 will engage the end of the plunger-bar connected to said tabulator-arm and thereby check the said toothed sector and its connected mechanism against momentum. In connection with this movement it will be observed that when the tubular arm 36 is swung from right to left, movement of the stop-plate 112 is in the opposite direction or from left to right, due to the link-connection between the tubular arm 36 and ear 47 of the slide-bar 48. The slide-bar 48 consequently moves the carrier in the same direction a proportionate distance corresponding to the movement of the toothed sector 9 so that if, as previously stated, the last or hundred-thousand tabulator-key being actuated, the carrier will move a distance of eight spaces, being checked by the stop-plate 112. This movement of the carrier is for the purpose of automatic adjustment of the paper and platen relative to the printing-point of the machine, whereby the figure to be printed is brought into the proper relative position denominating its numerical value relative to other figures in the item.

The lower slide-bar of the carriage is supported between the sections of the rear cross-rail 38, the upper slide-bar being supported by a cross-rail 38$^a$. Each slide-bar is arranged to travel upon suitable antifriction ball-bearings seated in said cross-rail sections, there being a coil-spring 114 connecting said slide-bar and an ear 115 of the cross-rail 38 as shown in Fig. 7, this spring being provided to operate in conjunction with the motor-spring 39 to feed the carrier from right to left when the tubular arm 36 is released by the escapement-mechanism.

The printing or recording mechanism of the machine consists of a series of ten type-bars 116, which type-bars are fulcrumed in a sector bracket 117 that is secured to the side-standards 1 and 2, the fulcrum-points of the type-bars being arranged to describe a segment of a circle relative to the printing-point upon the roller-platen, this construction being similar in principle to that in general use in forms of visible type-writers.

Arms 118 depend from the type-bars and are each connected, by a coil-spring 119, to arms 120 of the adding-key levers, there being rods 121 also connecting the type-bar arms 118 and arms 120 of the adding-keys. The ends of the rods 121 which connect the adding-key arms are slotted as shown, which slots are engaged by pins that project from said type-bar arms. The coil-springs, for convenience, are shown connected to the rods 121 adjacent to the arms 118 of the type-bars, but said springs may be connected directly to said arms if desired. The type-bars normally rest upon a strap 122 and are provided with type-characters from 0 to 9 inclusive, the ends of the arms 118 of all type-bars being arranged to engage a swinging spring-controlled gate 118$^a$, which gate is fulcrumed to ears 124 that depend from the sector-bracket 117. A lever-arm 125 depends from the gate and has connected thereto a thrust-rod 126, the free-end of which thrust-rod is guided in an ear 127 that extends from the side-standard 1 of the machine-frame. The thrust-rod 126 terminates in the path of travel of the universal bar 96, by means of which bar said thrust-rod is actuated. A standard 128 is secured to the sector-bracket 117, the standard extending to a point slightly below the printing-point of the roller platen, and is provided at its upper end with forked extensions 129, which extensions serve as guides for the type-bars.

A reciprocating ribbon-guide 130 is mounted upon the standard 128 having pairs of staggered fingers 131 between which the ribbon 133 is guided, the outer set of said fingers being provided with inturned ends 132 which serve to hold the ribbon 133 in position. The ribbon-guide 130 is linked to a lever 134, which lever is fulcrumed to an ear that extends from the sector bracket 117. As best shown in Figs. 2 and 5, the outer end of the lever 134 carries a link 135, the lower end of which link is slotted for the reception of a stud that is carried by a bell-crank 136, the stud being connected to the link by means of a coil-spring 137, which spring serves to seat the stud in the upper end of the link-slot, whereby a yielding-connection between said link and bell-crank is had. The bell-crank is pivoted to an extension of one of the ears 124 that depend from the sector bracket, one arm of said bell-crank being connected to the universal-bar 96, by means of a rod 138. The ribbon 133 is longitudinally divided into two colors, the upper color of which is designed to be utilized in printing items and the lower color for printing totals, the ribbon being normally held below the printing-point, whereby the last item printed is visibly displayed upon the platen.

The operation of the printing-mechanism just described is as follows: When an adding-key is depressed, its arm 120 distends the coil-spring 119 attached thereto, the pin carried by said arm having free movement in the slotted end of its rod 121 to permit distention of said spring. Just prior to completion of the depressed movement of the adding-key, the universal-bar 96 engages the thrust-rod 126 causing the gate 118$^a$ to swing down and release the arm 118 of the depressed type-bar, the coil-spring of which arm is now under tension. Thus contraction of the coil-spring causes this particular type-bar to swing upward and produce a printing-impact against the platen-roller, the pressure of the blow being entirely controlled by the spring-connection before mentioned, the rod 121 serving only to insure positive and speedy return of the type-bar to its normal position of rest. By providing spring-actuated type-bars to effect a printing-operation, it will be observed that a uniform impact is given to said type-bars and that the manual depression of a key only sets the springs which are thereafter released by means of the swinging-gate 118$^a$ so as to clear the type-bar arms 118 under spring-tension whereby printing is effected. In describing this action, all other type-bars are held in their normal position of rest by their rods 121, and thus the printing will be uniform and not dependent upon the touch of the operator. With the initial depression of an adding key, the bell-crank 137 is actuated through its rod 138, this movement causing the lever 134, through its connection to said bell-crank, to lift the ribbon-guide 130, the movement being so timed that the upper color of the ribbon is brought to the printing-point prior to an impact of the type-bar. The limit of the upward movement of the ribbon is controlled by an oscillatory bar 139, which bar is provided with a stop-face 140, that is normally engaged by the end of lever 134 to thus limit the upward movement of the ribbon-carrier, and although the lever movement is checked by the stop-face 140 of the bar, the bell-crank 137 has a further movement, which is compensated for by means of the coil-spring 119 and the slotted connection between said bell-crank and link. For obtaining a total, the lower color of the ribbon is utilized, and hence in a totaling-operation the ribbon must be elevated a greater distance than previously described in connection with item-printing. In this case the oscillating-bar 139 is shifted by mechanism to be hereinafter described, so as to bring a second stop-face 141 under the end of lever 134, this latter stop-face permitting the bell-crank 137 to move said lever 134 its full distance and thereby elevate the ribbon to such a position that its lower color is brought to the printing-line. To insure clearance of the type-bars from the platen immediately after a printing-operation, a yielding-strip 142, such as leather or other suitable material, is strung across the path of travel of the type-bars, the ends of said strip being connected to posts extending from the sector-bracket 117 by coil-springs 143. The tension of this yielding-strip is so adjusted with relation to the coil-springs 119 that when the type-bars perform a printing-operation, they will engage said yielding-strip 142, which strip immediately after impact of the bars causes recoil of the type-face sufficient to clear the same from contact with the paper carried by the roller-platen, whereby line-spacing of the platen and paper may be effected immediately after a printing-operation of the machine without smudging.

The ribbon 133 is coiled upon spools 144, and as shown in Figs. 3 and 6, the spools are provided with arbors 145 which are mounted in bearings extending from the strap 122 that also serves as a rest for the type-bars, as previously stated, said strap being secured to the side-standards 1 and 2 of the machine. The lower ends of the arbors 145 carry bevel-gear wheels 146 arranged to be alternately engaged by bevel-gear wheels 147, which gear-wheels are secured to a shaft 148 that is also mounted in bearings provided in the strap 122. The shaft 148 is longitudinally adjustable for the purpose of causing meshing-engagement of its bevel-gear wheels 147 with the bevel-gear wheels 146 of the respective ribbon-spools, whereby feed of the ribbon from one spool to the other may be reversed, the shaft being held in adjustment by means of a spring-controlled latch 149 which is arranged to engage either one of a pair of grooves 150 formed in said shaft.

Motion is imparted to the ribbon-feed shaft 148, by means of a pawl 151, which pawl is provided with a laterally extended face that engages the adjacent bevel-gear wheel 147 of said shaft. The pawl 151 is carried by a lever 152 that is fulcrumed to the side-standard 2, as shown in Fig. 3, the lower end of which lever is linked to the adjacent arm 97 of the universal-bar 96. Thus with each oscillating movement of said universal-bar intermittent rotation is imparted to the ribbon-feed shaft 148, by means of the pawl 151, which movement in turn is transmitted through the gear-connection with one or the other of the ribbon-spools, depending upon which spool at the time is in meshed engagement with its respective driving gear-wheel carried by said shaft.

In printing totals, the carrying-mechanism of all the adding-sections must first be reset or loaded by the action of the rocker-bar 22, the rocker-bar being then locked in its resetting position in such a manner that the sector 9 is free to successively actuate any or all of the adding-sections independent of said carrying-mechanism now locked. Thus when a total or footing is to be printed, the sector automatically adds to the amount indicated upon each adding-wheel a sum equal to the difference between the amount visible upon each adding-wheel and the registering capacity of each wheel, which capacity would be ten.

To obtain the reset and locking-movement of the carrying-mechanism incidental to recording a total, a manually operative total-lever 153 is provided. This total-lever is fulcrumed to an ear extending from the cross-brace 3 of the machine-frame, the ear being one of those in which the rocker-bar 22 is also fulcrumed. The arm 22$^a$ of the rocker-bar is connected to the total-lever, by a link 154, said link being provided with a slotted aperture for engagement with a pin that extends from the rocker-bar arm 22$^a$, and as best shown in Fig. 2, the pin is normally seated in that end of the slot farthest from said total-lever, whereby when said total-lever is rocked the arm 22$^a$ is actuated, and through rocker 22, the bell-cranks 12 of the carrying-mechanism are all lifted to reset or load the latter. The slotted connection between the loading-bar 79 and arm 22$^a$ permits this movement independent of any movement of said loading-bar. Movement of the total-lever is limited in either direction by suitable stops extending from the adjacent standard of the frame, and when said total-lever is moved to reset the adding-wheel carrying-mechanism, the aforesaid total-lever and connected mechanism is locked in this position by a gravity-dog 155, the nose of which dog engages a lug 156 that extends from the total-lever. The dog 155 is pivoted to the frame-standard 1 and in assuming its locking-position relative to the total-lever drops slightly so as to bring a laterally extending shoe 157 into the path of travel of the end of the loading-bar 79. When said loading-bar 79 is actuated by a movement of the universal-swing bar 77, incidental to depression of a tabulator-key, the end of the loading-bar will engage said shoe 157 and lift the dog from its locked position in connection with the lug 156 and thus cause release of the total-lever, which lever will return to its normal position, under suitable spring-control. The return movement also permits the rocker-bar 22 to recede from its locked position relative to the bell-crank arms 23 of the adding-section, whereby the several carrying-mechanisms are rendered free to act.

In totaling, the operator first actuates the tabulator-key so as to bring the sector 9 in vertical alinement with the adding-section of highest order in the group from which a total is to be taken. The operator next pulls the total-lever and locks the carrying-mechanism as stated. Now, for example, if the adding-wheels should show a total of 900.000.05, the numeral 9 indicated by the last adding-section must be printed, and this wheel revolved so as to bring its cipher to the visible point indicating the wheel as being clear. The first or "cents" wheel of the series must also be cleared, the numeral 5 being at present visible.

The arrangement for printing a total consists simply in the operator copying the amount indicated upon the register-mechanism, and hence if the numeral 9 should be copied, the operator must press the 9-key of the adding-levers, which lever should now, in place of actuating the adding-wheel nine spaces, as in an item-registration and printing-operation, actuate said wheel only one space, in order to clear said wheel and restore the cipher to the visible line. The adding-key 5 would next be depressed in order to print this amount, being the last figure in the total, and incidentally this movement must also move the adding-wheel five spaces so as to return the same to zero. This is accomplished through a transposition of the adding-key gage-plate 90, whereby the lateral position of the same is shifted horizontally from right to left so as to bring the arms 91 of the adding-keys into alinement with a second series of notches 158 with which the gage-plate is provided. The first notch of this series operates in conjunction with the second adding-key arm 91 from left to right of the machine the button of which key is numerically indicated by the figure 2. This first notch is of a depth equal to one space from the engaging-face of the key-arm 91, the second notch operating in conjunction with the third key-arm is of a depth equal to two spaces, and so on throughout the series, the notches each progressively increasing in depth step-by-step, the last series of notches having a depth of eight spaces and operate in conjunction with the "nine" key. The series of notches 158 increase in depth in the opposite direction from the first series of notches 93, and thus when the gage-plate is shifted, the notches 158 are brought in register with the arms 91 of the adding-keys, whereby movement of said gage-plate is controlled by said keys in the reverse from the movement previously described in connection with the series of notches 93, so that in printing a total 900.000.05, the 9-key being depressed to print the numeral 9, will only move the gage-plate a sufficient distance to cause the ninth adding-section to rotate one-tenth of a revolution, while the movement of the adding-key arm 91 makes a full stroke. To print the ciphers intervening between the numerals 9 and 5 of the example 900.000.05, the cipher-key would be depressed six times, there being no movement of the register-sections during this operation, due to the fact that the sector will not engage the same. At the completion of the series of depressions of the cipher-key to print the ciphers, the toothed sector 9 would be alined with the last or cents adding-wheel mechanism. The adding-key bearing the indicated numeral 5 would now be depressed, causing said cents-adding wheel to move five spaces, it being understood that in the transposition from one set of notches to the other of the gage-plate, that the notches of both series are of equal depth at that point of said gage-plate acted upon by the 5-key arm of the 5-key, due to the fact that this key whether being used for totaling or adding must impart the same movement to the aforesaid gage-plate, whereby the register adding-wheels are actuated five spaces.

The oscillatory movement of the sector 9 and its carriage is limited in a tabulating operation by means of a second set of fixed stops 159 similar to the fixed stops 94. The stops 159 start from the first or cipher key from right to left and are set off at different distances from the upper carriage-rail 26, the last stop of the series being affixed to the 2-key, and thus the first key of the series (the cipher key) when depressed will check the carriage 24, after the latter has oscillated only one space, while the second key, which is indicated by the numeral 9 will permit said carriage to move two spaces and so on, the space of the movement being variously limited throughout the system. In this manner, if the key bearing the numeral 2 should be depressed, its stop 159 would not check the oscillatory movement of the carriage until the latter had rotated a sufficient distance to move the sector 9 a distance of eight spaces, or if the 1-key is depressed, it would rotate an adding-section nine spaces, the movement being reversed by a depression of the 9-key, which would only rotate an adding-section one space and thus transposition of the movement controlling the adding-section is obtained, while the printing or recording mechanism would operate in a similar manner to that described in connection with an adding-operation. Shift of the gage-plate 90 is accomplished through a bell-crank 160, which bell-crank is pivoted to the side-standard 1 and is provided with pins 161 extending from one of its arms for engagement with the adjacent link 30, a pair of which, as previously stated, carry the gage-plate 90. The other arm of the bell-crank 160 is connected to the total-lever, by means of a link 162 having a slotted end for engagement with a stud 163 that is carried by said total lever, the slotted end of the link being provided to permit full throw of the aforesaid total-lever, the last portion of which throw is sufficient to actuate the bell-crank 160, the stud 163 being, prior to the completion of the throw of said lever, in the opposite end of the link-slot from that shown in Fig. 2. Thus with each operation of the total-lever, shift of the gage-plate 90 is obtained, it being understood that the links 30 are given a slight horizontal movement upon their supporting studs 29 of the carriage-frame and the studs 31 that extend from the hangers 32.

As shown in Fig. 2 of the drawings, the ribbon-movement controlling-bar 139 is held in its normal position engaging a pin of the standard by means of a coil-spring 164, in which position its stop-face 140 limits the movement of the ribbon as before mentioned. The lower end of the bar 139 is connected by a rod 165 directly to the total-lever, and when said total-lever is operated the position of said bar is shifted in opposition to the coil-spring 164 to thus bring the stop-face 141 into position under the end of the lever 134, whereby the ribbon is elevated to such relation to the printing-point that its lower or totaling-color is utilized. Thus with each totaling operation the printed record is displayed in a distinct color from that of the items-record. As soon as the total-lever is released by the loading-bar 97, due to movement of a tabulator-key after a totaling-operation, the said total-lever is returned to its normal position, by means of the coil-spring 134. When a tabulator-key is depressed, it is essential in the operation of the machine, that the same should be actuated the full distance of its throw. Hence to prevent a partial depression of a tabulator-key and its return to normal without performing its functions, a locking mechanism is connected to the loading-bar 79, whereby the same together with the tabulator-keys are prevented from prematurely returning to normal position, which position is shown in Fig. 1, there being also means in connection with the loading-bar whereby the locking-lever 105 before mentioned is brought into the path of travel of the depending finger 106 of the universal-bar arm 97, whereby all of the adding-keys are locked upon an initial movement of the loading-bar and held in this locked position until the loading-bar completes its movement. The locking-mechanism consists of a gravity-pawl 166, which pawl is pivoted to a bracket 167 that depends from the cross-brace 83. The nose of the pawl is arranged to engage a series of teeth 168 that project from the loading-bar, there being a pin 169 extending from the gravity-pawl 166 for engagement with a spring-controlled trigger 170, which trigger is also pivoted to the bracket 167. A tail 171 of the gravity-pawl is arranged to be engaged by a pin 172, which extends from the loading-bar, and is so spaced from the tail 171 of said pawl that it will engage the latter just prior to completion of the forward movement of said loading-bar. Upon an initial forward movement of the loading-bar, the pawl 166 engages the teeth 168 of said loading-bar and prevents a reverse movement of the latter, until its forward stroke has been completed, in which case the pin 172 will engage the tail of the dog and lift same from its tooth-engagement with the loading-bar. Simultaneous with this movement, the pin 169 carried by the pawl will be so elevated that the spring-controlled trigger 170 will drop under said pin 169 and thereby hold the pawl clear of the loading-bar teeth, permitting said loading-bar to return to its normal position, in which position a second pin 173, carried by the loading-bar, will trip the trigger 170 permitting the pawl to resume its normal position. Incidental to this movement of the loading-bar, a third pin 174 engages the lower or link-connected arm of the before mentioned locking-lever 105, whereby said locking-lever is actuated to effect its locking-engagement in connection with the finger 106 of the universal-bar arm 97, and thus all adding-keys are locked until the loading-bar has completed its forward and backward movement.

Referring to Figs. 1, 2, and 11, a mechanism is illustrated whereby, when any adding-key is depressed, the remaining keys of the series are locked until the depressed adding-key is returned to its normal position. This mechanism consists of a comb-plate 175 that is mounted upon a frame cross-brace 176, by means of a pair of links 177, only one of which is shown. A coil-spring 178 in connection with one of the links and a cross-brace 176, serves to hold the comb-plate in its normal position against a stop-pin 179, as best illustrated in Fig. 11. The comb-plate is provided with vertically disposed slots 180, which slots are normally disposed slightly out of vertical alinement with relation to the adding-keys, the latter being provided with extensions 181 which are adapted to engage said slots. The mouths of these comb-slots are inclined obliquely to the body portion in such normal relation to the key-extensions 181, that when a key is depressed, its extension will enter the oblique slot-mouth and cause a longitudinal movement of the comb-plate, due to engagement of said extension with one of the oblique walls of said slot-mouth. Thus when a key is depressed this movement of the comb-plate will cause the oblique mouths of the slots to pass under and bridge the path of vertical travel of the extensions 181 of all other keys of the series and prevent depression of the same. When the longitudinal movement of the comb-plate takes place, it is locked in by means of a spring-controlled latch 182, which latch is pivotally mounted upon the comb-plate and is provided with a head that engages a lug 183 projecting from the cross-brace 176. A tooth 184 that projects from a tail-portion of the latch 182 is arranged to engage a spring-controlled locking-dog 185, the engagement taking place when said latch has been moved to its locked position relative to the lug 183. The tooth 184 and locking-dog however are not in locking-engagement at this time, but said members are thereafter locked, by means of the depressed adding-key extension, which extension at the extreme end of its stroke engages a bail 186 that extends under all of the adding-keys and is hinged to ears extending from the cross-brace 176. The bail 186 normally rests upon a pin 187, which pin projects from the tail of the latch 182 and extends through a slot 187ª in the comb-plate 175. By this means it will be seen that after the comb-plate has been locked in its shifted position, by movement of an adding key, it will be so held until the extension 181 of the key engages the bail 186, the bail in turn depressing the tail of the latch, through its pin-engagement therewith and thus permits the locking-dog to snap over the tooth 184, whereby said locking-dog is held clear of its engaging-lug 183. The comb-plate is now free to swing back to its normal position, but is held by the key-extension 181, due to its engagement with the slot, thereby preventing said comb-plate from returning to its normal position until the key-extension strikes the oblique-portion of the slot mouth upon its return movement. The comb-plate will then return to its normal position, as shown in Fig. 11, with the dog and latch disengaged.

I claim:

1. A recording calculating machine comprising a platen, a carrier for the platen, a series of pivotally mounted key-controlled type-bars, each being provided with a type-character adapted to be brought to a common printing-point, a series of key-controlled adding-wheel sections, an oscillatory actuating toothed sector common to all adding-wheel sections, a manually controlled shifting mechanism in connection with the toothed sector whereby the same is moved into engaging position relative to any one of the adding-wheel sections, a spring-motor in connection with said toothed sector in opposition to its manually-controlled shifting-mechanism, an escapement-mechanism in opposition to the motor, and means controlled by the series of type-bars, whereby the degree of oscillatory movement of the toothed sector with relation to any one of the adding-wheel sections is arbitrarily determined by the movement of each type-bar incidental to a recording-operation.

2. In a recording calculator having a series of pivotally mounted key-controlled type-bars, each being provided with a type-character adapted to be brought to a common printing-point, and a longitudinally fed paper-carrier in operative connection with the type-bars, a series of gear-controlled adding-wheel sections, carrying-mechanism connecting the adding-wheel sections, an oscillatory actuated toothed sector common to all adding-wheel sections, a manually-controlled shifting-mechanism in connection with the toothed sector, whereby the same is moved into engaging-position relative to any one of said adding-wheel sections, a motor-spring in connection with said toothed sector in opposition to its manually-controlled shifting mechanism, an escapement-mechanism in opposition to the motor-spring, actuating means connecting the escapement-mechanism and key-controlled type-bars, whereby the toothed sector is automatically shifted from an adding-wheel section of higher order to the next section of lower order, and means controlled by the series of type-bars whereby the degree of oscillatory movement of the toothed sector with relation to any one of the aforesaid adding-wheel sections is arbitrarily determined by movement of each type-bar incidental to a recording-operation.

3. A recording calculator comprising a series of ten pivotally mounted type-bars, each being provided with a type-character adapted to be brought to a common printing-point, a longitudinally movable platen-carrier, a series of ten key-levers each being connected with one of the type-bar series, a series of adding-wheel sections each being provided with an independent actuating-gear, a spring-controlled carrying-mechanism in connection with each adding-wheel section of lower order and the next adding-wheel section of higher order, an oscillating toothed actuating sector common to all adding-wheel actuating gears, a spring-controlled shifting-mechanism in connection with the toothed sector, key-controlled means whereby the sector-shifting mechanism is actuated in opposition to its spring-control, an escapement release mechanism for controlling movement of the sector-shifting mechanism relative to its spring-control, means connecting the sector-shifting mechanism and platen-carrier, and means controlled by the type-bar key-levers whereby the degree of oscillatory movement of the toothed sector is determined.

4. In a recording calculator having a series of type-bars adapted to be brought to a common printing point, a series of non-shiftable alined adding-wheels, an actuating-gear for each adding-wheel, a shiftable toothed sector, a series of key-levers corresponding in number to the adding-wheels, means controlled by each key-lever of the series for alining the toothed sector with the actuating-gear of a selected adding-wheel of higher order, a second series of key-levers in connection with the type-bars, and an oscillatory mechanism in connection with the toothed sector and second series of key-levers.

5. In a recording calculator having a series of type-bars adapted to be brought to a common printing-point, a series of alined adding-wheels, an actuating-gear for each adding-wheel, a spring-controlled carrying-mechanism in connection with each adding-wheel of lower order and the next adding-wheel of higher order, locking means in connection with the carrying-mechanism, an oscillating toothed sector, spring-controlled means for shifting the sector to an alined position relative to any one of the adding-wheel actuating gears, a gage-plate in connection with the shifting means, a series of key-levers corresponding in number to the adding-wheels in operative-connection with the gage-plate, whereby shift of the toothed sector from an adding-wheel of lower order to an adding-wheel of higher order is controlled, an escapement-mechanism in connection with the spring-controlled shifting-mechanism of said toothed sector, a gage-plate in connection with the aforesaid toothed sector, whereby its oscillating movement is controlled, a series of key-levers in operative-connection with the last named gage-plate and type-bars, and a universal-bar in operative-connection with the last named series of key-levers and escapement-mechanism of the aforesaid toothed sector shifting means.

6. A recording-calculator comprising a series of type-bars adapted to be brought to a common printing-point, a series of adding-wheels, actuating-gears carried by the adding-wheels, an oscillatory toothed sector for engagement with the actuating gears, means for initially adjusting the toothed sector from an adding-wheel of lower order to an adding-wheel of higher order relative to any adding-wheel of the series, a platen-carrier in connection with the adjusting means, a spring-actuated carrying-mechanism in connection with each adding-wheel of lower order and the next adding-wheel of higher order, loading means connecting the carrying mechanism and toothed sector adjusting means, a series of key-levers in connection with the type-bars, means operative by the key-levers for imparting different degrees of oscillating movement to said toothed sector, a motor-spring in connection with the aforesaid toothed sector, whereby the same is moved from an adding-wheel of higher order to an adding-wheel of lower order, a step-by-step escapement-mechanism in opposition to the motor-spring, actuating mechanism for the escapement controlled by the key-levers, a total-lever in connection with the carrying mechanism loading means, and locking-and-release means in connection with the total-lever.

7. In a recording-calculator having a series of type-bars, adapted to be brought to a common printing-point, a series of adding-wheel sections in operative-connection with the type-bars, a longitudinally movable carrier, and a platen independently adjustable longitudinally of the carrier.

8. In a recording-calculator having a series of type-bars, adapted to be brought to a common printing-point, a series of adding-wheel sections in operative-connection with the type-bars, a longitudinally movable carrier, a motor-spring in connection with the carrier whereby the same is actuated in one direction, a series of key-levers for controlling longitudinal movement of the carrier in opposition to the motor-spring, a roller-platen adjustable longitudinally of the carrier, means controlled by the series of key-levers for imparting intermittent rotation to the roller-platen, an escapement-mechanism in connection with the carrier, a series of key-levers in connection with the type-bars, and means in connection with the last named series of key-levers and escapement-mechanism, whereby a step-by-step movement of the carrier is had incidental to movement of any one of said key-levers.

9. In a recording calculator having a series of type-bars adapted to be brought to a common printing point, a series of fixed adding-wheel sections in operative connection with the type-bars, an oscillatory carriage frame, a longitudinally movable carriage mounted upon the frame, actuating means common to all adding-wheels carried by the carriage for imparting rotation to the same, a motor-spring in connection with the carriage whereby the same is longitudinally actuated in one direction, a series of key-levers for arbitrarily controlling longitudinal movement of the carriage in opposition to the motor-spring, a roller-platen, means for imparting intermittent rotation to the roller-platen, an escapement mechanism in connection with the carriage, a second series of key-levers in connection with the type-bars, and means in connection with the last named series of key-levers and escapement mechanism, whereby a step-by-step movement of the carriage is had incidental to movement of any one of said second series of key-levers.

10. In a recording-calculator having a series of type-bars, adapted to be brought to a common printing-point, a series of fixed adding-wheel sections in operative-connection with the type-bars, actuating gears for each adding-wheel, an oscillating carriage-frame, a toothed sector longitudinally adjustable upon the carriage-frame, the toothed sector being adapted to engage any one of the adding-wheel actuating-gears, a universal gage-plate in connection with said carriage-frame, and a series of key-levers in connection with the type-bars adapted to have operative-engagement with the gage-plate.

11. In a recording-calculator having a series of type-bars, adapted to be brought to a common printing-point, a series of adding-wheel sections in operative-connection with the type-bars, actuating-gears for each adding-wheel, an oscillating carriage-frame, a toothed sector longitudinally adjustable upon the carriage-frame, the toothed sector being adapted to engage any one of the adding-wheel actuating-gears, a gage-plate in connection with said carriage-frame, having two series of stepped faces, a series of key-levers in connection with the type-bars, the levers being adapted to engage the stepped faces of the gage-plate, and a shifting-mechanism in connection with said gage-plate, whereby one or the other series of notches are brought into engaging-position with relation to the key-levers.

12. In a recording-calculator having a series of type-bars adapted to be brought to a common printing-point, and a series of alined gear-actuated adding-wheels, a spring-actuated carrying-mechanism connecting each adding-wheel of lower order and the next adding-wheel of higher order, a loading-mechanism common to all carrying-mechanisms, a total-lever in connection with the loading-mechanism, lock-and-release means in connection with the total-lever, an oscillating carriage-frame, a gage-plate in connection with the carriage-frame, the gage-plate being provided with two series of stepped faces, a series of actuating key-levers in connection with the type-bars, arms extending from the key-levers adapted to engage one or the other series of stepped faces of the aforesaid gage-plate, means in connection with the total-lever and gage-plate whereby the position of the latter is changed relative to the key-lever arms, a longitudinally movable toothed sector mounted upon the oscillatory carriage-frame, the toothed sector being arranged to engage the adding-wheel actuating-gears, and means for controlling the longitudinal movement of said toothed sector.

13. In a recording-calculator having a series of type-bars adapted to be brought to a common printing-point, and a series of alined gear-actuated adding-wheels, a spring-controlled oscillatory carriage-frame, a longitudinally movable toothed sector mounted upon the carriage for engagement with any one of the gear-actuated adding-wheels, a gage-plate in connection with the carriage-frame, a series of spring-controlled key-levers arranged to oppose the gage-plate, whereby different degrees of oscillatory movement are imparted to the carriage-frame, series of stops carried by the key-levers engageable with said carriage-frame, and means connecting said key-levers and type-bars.

14. In a recording-calculator having a series of type-bars adapted to be brought to a common printing-point, a series of alined gear-actuated adding-wheels, a spring-controlled oscillating carriage-frame, a longitudinally movable toothed sector mounted upon the carriage for engagement with any one of the gear-actuated adding-wheels, a gage-plate in connection with the carriage-frame, a series of spring-controlled key-levers arranged to oppose the gage-plate, whereby different degrees of oscillatory movement are imparted to the carriage-frame, arms extending from the type-bars, actuating-springs connecting the arms and key-levers, a locking-gate disposed to engage the type-bar arms, and gate-releasing means controlled by the aforesaid key-levers.

15. In a recording-calculator having a series of type-bars adapted to be brought to a common printing-point, a platen disposed at the printing-point, arms extending from the type-bars, a gate engageable with the arms, a series of key-levers, actuating-springs connecting said arms and key-levers, a yielding strip interposed between the platen and type-bars, whereby the latter are retracted from contact with the platen, and means in connection with the gate controlled by the key-levers, whereby said gate is disengaged from the type-bars incidental to depression of a key-lever.

16. In a recording calculator having a series of type-bars adapted to be brought to a common printing point, a series of adding-sections in operative connection with the type-bars, each of which series comprises an adding-wheel, a pinion revoluble with the adding-wheel, a spring-actuated bell-crank, a feed-pawl carried by the bell-crank for engagement with the pinion of the adding-wheel, a tail extending from the feed-pawl, a fixed pin adapted to engage the feed-pawl tail, whereby said pawl is positively held into engagement with the pinion, a tooth extending from the adding-wheel, a spring-controlled trip-latch engageable with the tooth of the adding-wheel section of lower order, a dog carried by the trip-latch, a stud extending from the bell-crank with which the dog has locking engagement, and a universal rocker arranged to oppose the bell-cranks of the adding-wheel sections.

17. A recording-calculator comprising a frame, a slidable carrier mounted in the frame, a spring connecting the carrier and frame, a carriage longitudinally adjustable relative to the carrier, a roller-platen carried by the carriage, a swinging-arm in pivotal connection with said frame, an escapement-mechanism engageable with the arm, connecting means between the carrier and arm, a series of key-levers, means connecting the key-levers and escapement-mechanism, a series of type-bars adapted to be brought to a common printing-point relative to the platen, means connecting the type-bars and key-levers, brackets secured to the frame, a series of adding-wheels revolubly mounted upon the brackets, an actuating-gear for each adding-wheel, spring-controlled bell-cranks in pivotal connection with the brackets, feed-pawls carried by the bell-crank trip-latches engageable with said bell-cranks, an oscillatory carriage-frame, a carriage mounted upon the carriage-frame, a toothed sector extending from the carriage adapted to engage the actuating-gears of the adding-wheels, means connecting said carriage and swing-arm, a rocker arranged to engage the bell-cranks, a gage-plate in connection with said carriage-frame, the gage-plate being adapted to be actuated by engagement with the aforesaid key-levers, a lever-controlled shifting-mechanism in connection with said rocker and gage-plate, a second series of key-levers corresponding in number to the adding-wheels, a universal bar in connection with the last named series of key-levers, means connecting the universal-bar and rocker, a second gage-plate in operative-engagement with said last named series of key-levers, the gage-plate being in link-connection with the swinging-arm, a stepped-face stop-plate in rigid connection with the carrier, a series of plunger-bars in connection with the second series of key-levers arranged to engage the stop-plate, a two-color ribbon, a reciprocative guide for same, means in connection with the first series of key-levers for raising and lowering the guide relative to the printing means in connection with the lever-controlled shifting mechanism, whereby limit of the movement of the ribbon-guide is controlled, a line-feed mechanism and actuating means for the line-feed mechanism and second series of key-levers.

18. In a recording-calculator having a series of type-bars adapted to be brought to a common printing-point, a frame, a slidable carrier mounted in the frame, a carriage longitudinally adjustable in the frame, means for locking the carriage in adjusted position relative to the frame, a swinging spring-opposed arm mounted upon said frame, a series of teeth carried by the arm, an escapement-mechanism for engagement with the teeth, in opposition to the spring-pressure exerted upon the arm, connecting means between the carrier and arm, a series of key-levers in connection with the type-bars, and escapement-release means controlled by said key-levers.

19. In a recording-calculator having a series of type-bars, adapted to be brought to a common printing-point, a series of alined gear-actuated adding-wheel sections, a spring-controlled carrying-mechanism for each adding-wheel, a universal rocker-bar for loading the carrying-mechanisms, an oscillatory carriage-frame, a carriage having a toothed sector mounted upon the frame for engagement with the gear-actuated adding-wheel sections, an escapement-controlled swinging-arm in connection with the toothed sector carriage, a universal-bar for controlling movement of the escapement-control of the swinging-arm, a gage-plate, a series of key-levers in operative-connection with the universal-bar and gage-plate, a second gage-plate in link-connection with the swinging-arm and a second universal-bar, a second series of key-levers adapted to have operative-engagement with the second universal-bar and gage-plate, a loading-bar in link-connection with the second universal-bar, a loading-mechanism in operative connection with the loading-bar, means carried by the first universal-bar for engagement with the locking-mechanism, whereby the first series of key-levers are locked, and means controlled by movement of the toothed sector carriage in connection with said locking-mechanism, whereby the first series of key-levers are locked.

20. In a recording-calculator having a series of type-bars adapted to be brought to a common printing-point and a series of adding-wheel sections in operative-connection with the type-bars, a series of key-levers, a spring-connection between the key-levers and type-bars, whereby said key-levers have movement independent of the type-bars, locking means for said type-bars, other means connecting the type-bar locking means in operative-connection with the aforesaid key-levers, and mechanism in connection with the key-levers whereby when a key-lever is operated all other key-levers are locked.

21. In a recording-calculator having a series of type-bars adapted to be brought to a common printing-point, a longitudinally movable carrier, a carriage mounted upon the carrier, the carriage having independent longitudinal adjustment relative to said carrier, means for locking the carriage in adjusted position relative to said carrier, a roller-platen carried by the carriage, a ratchet-wheel secured to the roller-platen, a bail in pivotal connection with said carriage, a feed-pawl carried by the bail for engagement with the ratchet-wheel, a series of key-levers, means connecting the key-levers and carrier, whereby the same is adjusted in one direction at different fixed distances, an escapement mechanism for controlling movement of the carrier in the opposite direction, a universal-bar in operative-engagement with the series of keys, a thrust-rod for engagement with the carriage-bail, and means for imparting movement to the thrust-rod in connection with the universal-bar.

22. In a machine of the character described, a series of adding-sections in operative connection with type-bars, each of which sections comprises an adding-wheel, a pinion revoluble with the adding-wheel, a spring-actuated bell-crank, a feed-pawl carried by the bell-crank for engagement with the adding-wheel pinion, a tail extending from the feed-pawl, a fixed pin for engagement with said feed-pawl tail, whereby the feed-pawl is locked in engagement with said adding-wheel pinion, a carrying mechanism, releasing means for the carrying-mechanism in connection with the adding-wheel of lower order, means for locking said carrying-mechanism carried by the bell-crank, and a universal rocker arranged to oppose the bell-cranks of all adding-sections, whereby the carrying mechanisms of said adding-sections are loaded.

23. In a calculating machine having a series of adding-wheels, actuating-gear therefor and a series of key-levers; the combination of controlling means interposed between the actuating-gear and key-levers for limiting differential movement relative to the adding-wheel series in one direction, and shifting means for the controlling means, whereby the aforesaid moving of all adding-wheels of the series is relatively changed.

24. In a calculating machine having a series of adding-wheels, actuating-gear therefor and a series of key-levers; the combination of shiftable controlling means interposed between the actuating-gear and key-levers for limiting differential movements relative to the adding-wheel series in the same direction.

25. In a calculating machine having a series of adding-wheels, actuating-gear therefor and a series of key-levers; the combination of a shiftable mechanism coöperative with the actuating-gear and key-levers for effecting two distinct series of differential movements of the adding-wheels.

26. In a recording calculator having a series of type-bars, actuating means for the type-bars, a series of adding-wheels, actuating-gear therefor and a series of key-levers connected to the type-bar actuating means and adding-wheel actuating-gear; the combination of a shiftable mechanism coöperative with the actuating-gear of the adding-wheels and key-levers for effecting two distinct series of differential movements of said adding-wheels.

27. In a recording calculator having a printing mechanism, a series of adding-wheels, a series of key-levers, actuating mechanism connecting the key-levers and adding-wheels and other actuating mechanism connecting the key-levers and printing mechanism; the combination of controlling means interposed between the adding-wheels and actuating mechanism therefor, whereby printed amounts are indicated upon the adding-wheels by rotation of the same in one direction, and a shiftable total mechanism connected to the controlling means whereby total amounts are printed and the adding-wheels returned to zero by further rotation in the same direction as the aforesaid.

In testimony that I claim the foregoing I have hereunto set my hand at Milwaukee, in the county of Milwaukee and State of Wisconsin in the presence of two witnesses.

JAMES MALLMAN.

Witnesses:
GEORGE G. FELBER,
ROLAND W. DERRY.